Sept. 20, 1955 — R. E. WALKER — 2,718,214
HOOF-TRIMMING STALL
Filed April 14, 1954 — 2 Sheets-Sheet 1
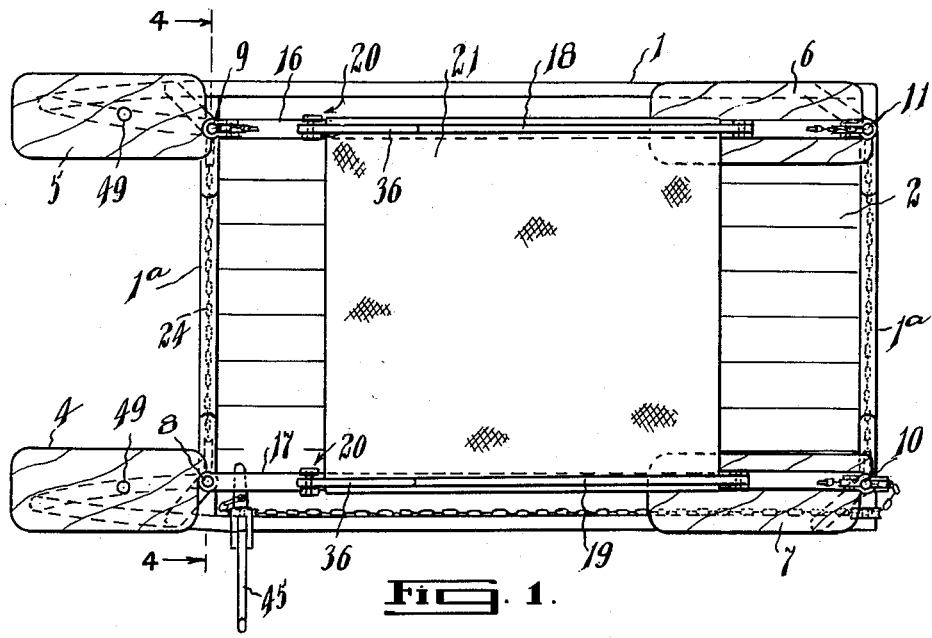
Fig. 1.
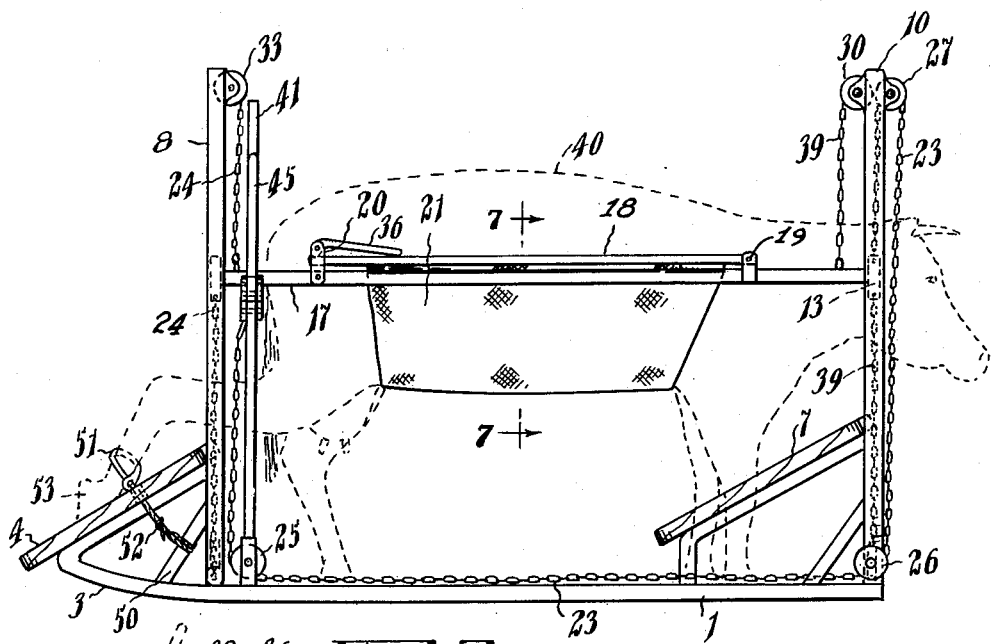
Fig. 2.
Fig. 8.
INVENTOR
ROBERT E. WALKER
By Frederick C. Bromley
ATTY.

Sept. 20, 1955 R. E. WALKER 2,718,214
HOOF-TRIMMING STALL
Filed April 14, 1954 2 Sheets-Sheet 2
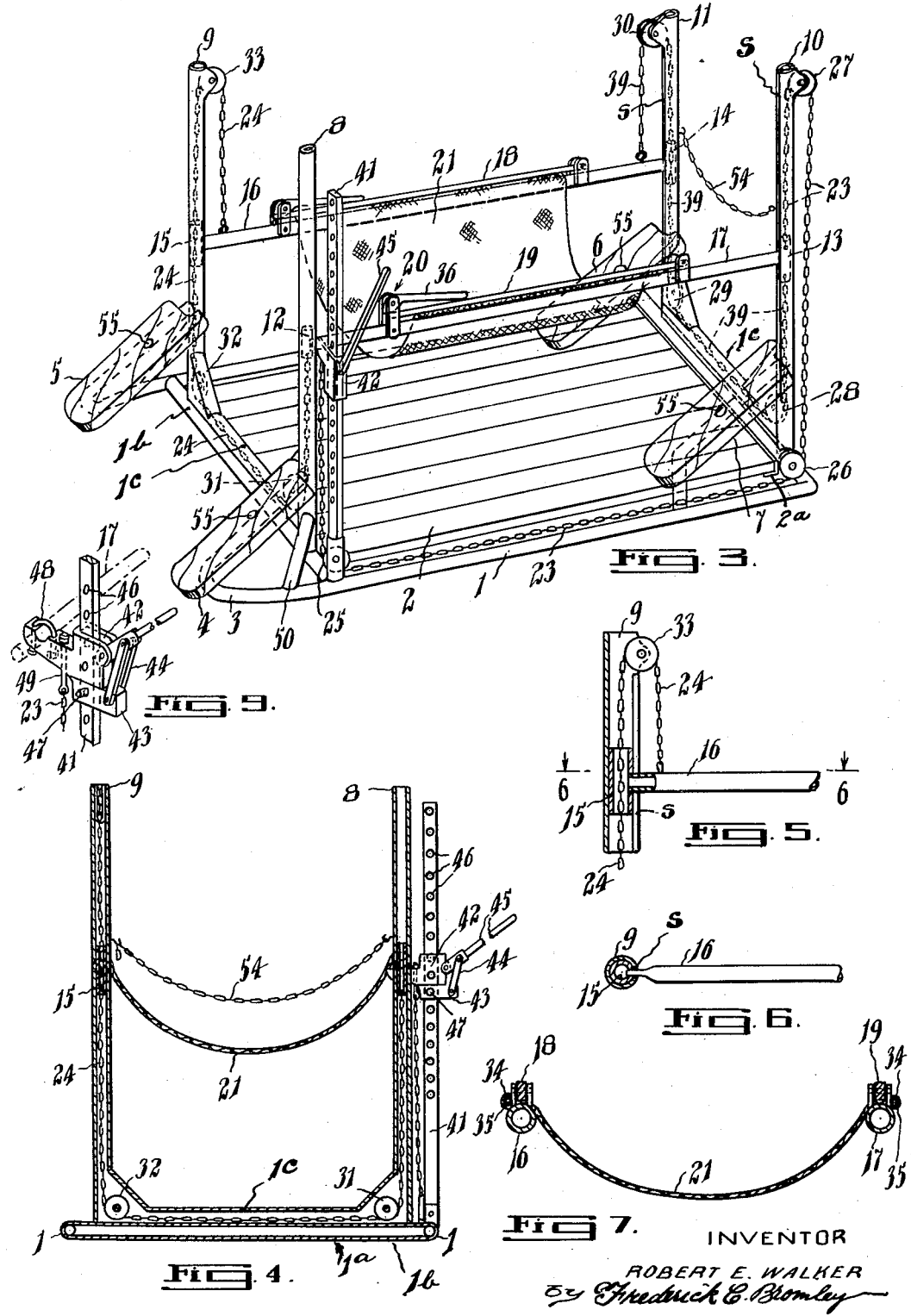
INVENTOR
ROBERT E. WALKER
By Frederick E. Bromley
ATTY.

United States Patent Office 2,718,214
Patented Sept. 20, 1955

2,718,214

HOOF-TRIMMING STALL

Robert E. Walker, Port Perry, Ontario, Canada

Application April 14, 1954, Serial No. 423,120

7 Claims. (Cl. 119—102)

This invention relates to apparatus for restraining the movements of an animal and for forcibly positioning any foot thereof during an operation such as hoof-trimming.

Animals, particularly dairy cattle which range on restricted and cultivated feeding grounds, develop split and scaly hoofs which require frequently to be trimmed in order that they may be maintained in a healthy condition.

For want of a satisfactory trimming facility it has been the custom among pastoralists to lash the feet of an animal and throw it upon its side upon the ground and to there maintain it while performing a hoof-trimming operation. The operation of hoof-trimming is frequently attended by much greater loss of time in the maintenance of control of the animal than is expended in the actual trimming operation.

Over the years various devices have been contrived for restraining an animal during an operation such as hoof-trimming. In the main these have consisted of a framework or stall sometimes fitted with pedal supports, in some cases a belly support, and in one or two cases slings have been contrived for literally suspending an animal while endeavoring to operate upon its hoofs.

It is an object of the present invention to provide an improved stall for restraining an animal during a veterinary operation, such as hoof-trimming.

It is a further object to provide an arrangement of the kind indicated which is so devised that a fractious animal can, with a minimum of human effort and a maximum of human safety, be securely restrained and wherein each or any hoof can be safely grasped, positioned and restrained while performing an operation such as hoof-trimming.

The inclination of a cow is to be more tractable during a hoof-trimming operation if it is supported evenly over its belly so that its legs are in a normal standing attitude, but relieved of the animal's weight. It has been found advantageous also to avoid narrow straps or buckles in the belly supporting means and the latter should be capable of raising the animal so that all its hoofs are relieved of weight simultaneously. The animal when so lifted and restrained is virtually helpless but physically comfortable so that it usually ceases to struggle and becomes docile and tractable.

According to my invention, the improved hoof-trimming stall comprises a platform, a boundary framework extending upwardly therefrom, a hammock of flexible material, right and left lateral supports for said hammock, means for raising and lowering said lateral supports simultaneously in similar senses so as to maintain said hammock in a substantially uniform supporting attitude over an operating range, and means for positioning and restraining any selected leg of an animal in a specified attitude for trimming the hoof thereof.

In one selected embodiment, the means for raising and lowering the hammock comprises two lateral bars arranged in parallel relation to flank an animal, and supported slidably at their ends upon corner posts of the boundary framework. In particular the bars are supported at their ends by flexible cables riding over pulleys and arranged in such a manner that when one end of one bar is lifted or depressed, all the other bar ends follow suit in complete synchronism so that a hammock suspended from these bars will rise or fall with them without changing its angular attitude, for example a horizontal attitude, with respect to the platform.

More specifically, the hammock includes at its lateral extremities a hemmed piping or loop containing therewithin a rigid rod or bar. The lateral support bars each include a hinged latching bar. The hammock can be fastened to a lateral support by latching a respective hemmed rod against the junction of a latching bar. One side of the hammock can be locked to one support bar before an animal enters the platform and then by a deft movement of a hand the other piped side of the hammock can be swiftly brought up over the corresponding support bar and latched thereto.

To facilitate raising a cow to render it helpless by taking the weight off the feet, it is practically essential to provide an aid for lifting the hammock which incorporates some sort of power multiplier such as a lever or comparable means. The applicant has discovered that this can be most effectively provided by means of a leverjack of the "inching" type, and since when one end of one bar is raised, all the others follow suit, only one jack is required and this may be positioned to engage either of the two hammock support bars at any point thereon. This jack may be of portable type or may be permanently positioned at a convenient point with respect to one of the support bars which is the case in the present disclosure.

When an animal has been led into the apparatus to stand upon the platform and has been virtually rendered helpless by the lifting of the hammock, the beast may still kick out and flail the air with its limbs making it difficult to restrain the leg of which the hoof is to be trimmed. The construction hereinbefore described restrains the animal so that if its hoofs do flail it cannot move its body either sideways or back or forward. Having reached this stage in controlling the animal it now remains to seize and immobilize the selected leg. In this regard it is known to provide a pedal support in the form of an inclined flat member located near a leg of an animal in a stall. The present inventor employs a device of this kind but with an important modification: the pedal support of this invention includes a hole affording passage for a flexible member such as a length of rope having a noose at one end. When the animal is in position in the stall, an operator slips the noose over a selected limb and tightens the noose thereabout. Then by pulling upon the rope from the under side of the hole in the pedal support, the animal's limb is restrained and forcibly drawn over against the platform. The taut rope can then be lashed to an appropriate member of the boundary framework.

The invention will now be fully elucidated by description of the selected example of construction herein disclosed in the accompanying drawings wherein:

Figure 1 is a view looking down upon a hoof-trimming stall constructed in accordance with the invention.

Figure 2 is a side elevation of the construction depicted in Figure 1.

Figure 3 is a perspective view of the construction depicted in Figures 1 and 2.

Figure 4 is a cross section on a line 4—4 of Figure 1.

Figure 5 is an enlarged fragmentary section of an end of a lateral hammock support bar at the entrance end of the stall and on the far side of the stall as shown in Figure 2.

Figure 6 is a section on line 6—6 of Figure 5.

Figure 7 is a cross section on line 7—7 of Figure 2.

Figure 8 is an enlarged fragmentary detail of the latch device by which an end of a hammock can be locked in position on a lateral bar and quickly detached therefrom.

Figure 9 is a fragmentary perspective view showing an inching jack adapted for lifting the hammock in accordance with the teachings of the invention.

Referring now to these figures, a main stall framework includes tubular side members 1 rigid with tubular end members 1a forming a base, and four corner uprights 8, 9, 10, 11 all welded with bottom corner gussets and braces. The forward or entrance end of the stall has upturned ends on the side members 1 which in addition to acting as supports for the pedal supports 4, 5 also function as leading edges when the stall is dragged over the ground, the members 1 acting as sled runners. A platform 2 is comprised of planks set in angle iron supports 2a welded to the rectangular base of the framework—see Figure 3. A second pair of pedal supports 6, 7 are supported on braces welded to the exit end of the framework.

It will be noted that each end member 1a is made up of two lengths of pipes, one immediately above the other and fastened together. The bottom pipe 1b is joined to the side members 1, whereas the top pipe 1c is open at its ends to the hollow corner posts 8 and 9.

The uprights 8, 9, 10, 11 are slotted through the major portions of their lengths. The slots indicated at S, face inward as between pairs 9, 11 and 8, 10. Each upright contains a tubular slide member and these slide members are denoted 12, 13, 14 and 15. A lateral hammock support bar 16 is supported at its respective ends by slides 14, 15 and similarly a support bar 17 by slides 12, 13. The slides and the associated lateral bar ends are held in captive relation to one another by flexible cables 23, 24 and 39 (depicted as chains), which pass over pulleys 25, 26, 27, 28, 29, 30, 31, 32, 33: the arrangement and purpose of this cable system is designed to enable the two bars 16, 17 to be raised and lowered as required for the purposes of the invention without the two bars at any time departing from a corresponding co-planar attitude. The arrangement of these cable supports is clearly depicted in Figure 3 and its manner of operation will be disclosed in detail later.

The support bars 16, 17 each carry a hammock clamp bar 18 which is hinged to the support bar at one end as at 19, and is locked down in parallel relation to its corresponding support bar at its free end by a hinged latch 20 comprising a lever 36 having a cam part, and fastened to the support bar by hinge links 38. (See Figure 8.)

The hammock 21 is composed of a preferably flexible material such as heavy canvas or sail cloth and its sides are piped as at 34 to form loops. A rigid member 35 such as a steel rod is passed through each piping and these act as abutments for lashing the hammock to the support bars 16 and 17. One piped side of the hammock is latched onto, say, bar 16 by inserting the piped edge between bars 18 and 16 and then throwing the cam lever 36 to clamp the bar 18 against supporting bar 16. The hammock may then hang downward from the bar 16 until an animal shall have entered the stall. At such a time the free piped edge of the hammock is grasped and quickly brought around under the animal's belly and pulled over bar 17. The locking bar 18 is laid down under latch 20, the hinged links pulled forward, the cam lever 36 turned downward to the position shown in solid lines in Figure 8 and the hammock is fully supported on the respective bars 16, 17. The hammock obviously could be initially hung from either bar 16 or bar 17 depending upon whether left hand or right hand action is desired.

Let us now assume that a cow has entered the stall and been made captive by the hammock 21 slung as described and illustrated. The next move is to further immobilize the animal by removing its weight from its limbs. This involves raising the bars 16, 17 a suitable distance upwardly but keeping them always parallel and horizontal in attitude; since the animal is probably still resistive, this must be done quickly.

The parallel bars 16, 17 are inter-connected by the pulley and cable arrangement as follows: cable 23, attached to bar 17 at its forward end in a manner to be described, passes over pulleys 25, 26, 27 and passes down into corner post 10 and is fastened to the lower end of slide 13. Cable 24 is fastened at an end to slide 12 and extends downwardly therefrom in post 8 thence passes through the lower portion of corner support tube 8, over pulleys 31, 32 up through tubular corner support 9 freely through slide 15 and over pulley 33 from which it extends downwardly and is secured to the forward end of support bar 16. Cable 39 is fastened to the lower end of slide 13 and extends downwardly through the lower portion of corner tubular upright 10 over pulleys 28, 29 up through tubular upright 11 and passes freely through slide 14 over pulley 30 and downwardly therefrom and is fastened to the rear end of support bar 16. This mechanical linkage is of such a nature that when pressure is applied upwardly at a point on support bar 16, both bars will rise together by the same amount and always remain in a horizontal and parallel attitude if the length of the linking cables has been such as to once pre-set them in this attitude. This attitude is not necessarily a strictly horizontal or parallel one. The bars can be pre-set in any desired relationship and they will always maintain that relationship when raised or lowered. In the presently described embodiment a parallel and horizontal relationship is preferred.

As a matter of convenience the elevating means 22 for quickly raising and lowering the hammock is located at the forward right corner of the stall, and takes the form of an inching jack of a known construction. This is shown most clearly in Figures 4 and 9, and includes an upright member 41 provided with a series of suitably spaced holes 46, a jack claw 42, an inching block 43, a hinge linkage 44 and a hand lever 45. Detent pins 47 lock the jack claw and the inching block 43 at any desired elevation on the upright 41 and the jack claw 42 is fastened to hammock support bar 17 near its forward end by U-clamp 48. For convenience the cable 23, which theoretically is connected to bar 17, is actually fastened to jack claw 42 by a length adjusting eye bolt 49.

Now, when the hammock has been lashed to the horizontal support bars, the inching block is set in a position appropriate to the height of the animal's belly above the platform and the hand lever 45 is then oscillated. This quickly raises both bars 16 and 17 and lifts the animal in its hammock so that its hoofs rest lightly and helplessly upon the planking 2. A hoof may now be placed on the nearby pedal support for a trimming operation. Desirably the hoof is held against movement by lashing it to the pedal support. For this purpose I provide a flexible element such as a length of pliant rope having a noose at one end: the other end of the pliant member is passed through an aperture 55 in the pedal support and is lashed to one of the braces such as 50. The noose 51 is opened up and slipped over a selected limb of the animal and the flexible member 52 thereof is pulled through the aperture 55 until the animal's hoof is positioned in operating attitude upon the pedal support 4. This artifice proves such power that the animal cannot successfully resist it and the member 52 can be lashed to the brace 50 so that the hoof 53 is firmly restrained. The veterinary process can now proceed without risk of interference and, quite obviously, the task of treating the hoofs can now be carried out expeditiously. That would not be possible with a less ingenious arrangement.

The present apparatus operates with speed and precision and can in most instances be operated entirely by one person. The animal walks into the stall and is at once confronted by the guard chain 54, and the hammock is whipped up under its belly and snapped over bar 17 and locked up. The lever 45 of the jack is quickly operated and the animal in a matter of seconds after entering the stall finds itself deprived of the use of its limbs simultaneously. A hoof is pulled up and lashed to the pedal support for trimming. The other hoofs are trimmed successively with ease and facility.

When it is desired to release the animal, the operator unhooks guard 54, lowers the hammock and unlocks one or the other of the latches 20 thus releasing one side of the hammock which instantly falls clear of the planking and the animal is then free to walk out of the stall.

It will be evident that, in its broad aspect the invention embraces two salient features, a hammock which can be raised and lowered over a limited range very swiftly, and can be with equal speed placed in position or caused to swing clear of the stall passage way.

In a further aspect these features contribute speed and precision of control to a following operation of immobilizing and positioning a selected hoof of the animal in an appropriate operating attitude.

Whereas the construction just described constitutes what is at present the preferred manner of carrying the invention into effect, it will be obvious to those skilled in the art that various modifications can be made without departing from the spirit of the invention as defined in the appended claims.

What is claimed is:

1. A hoof-trimming stall of the kind described comprising a platform, a bounding framework for said platform having rigidly supported corner posts extending upwardly therefrom, a hammock of flexible material, right and left substantially horizontal support bars for said hammock each slidably supported upon a corresponding pair of said corner posts, flexible control elements mounted on said corner posts and interconnecting the respective ends of said horizontal support bars in such order that when one support bar slides upwardly or downwardly, the other support bar is caused to perform a substantially similar excursion, and jack means operatively associated with a predetermined point on one of said support bars for selectively applying a lifting force at a selected point on one of said support bars.

2. A structure as defined in claim 1, in which a manual jack is employed having an inching element which is raised by working a hand lever, and in which the jack is anchored to said framework and has the inching element connected to one of the support bars.

3. A structure as defined in claim 1, wherein the means for raising and lowering said support bars comprises an inching jack characterized by a main upright member, an inching block selectively positionable along the length of said upright member, a lifting claw firmly attached at a selected point to one of said horizontal support bars, and a lever cooperating with said inching block and said claw for raising and lowering said claw and said attached horizontal support bar over a predetermined range.

4. A structure as defined in claim 1, in which the jack means comprises a conventional jack having a base and an element which is projected therefrom by manually-operable means, and in which said jack is operably associated with a base portion of said frame-work and one of the support bars.

5. A hoof-trimming stall comprising a frame including a base and uprights rigid therewith, said uprights defining an ingress end and an egress end and arranged in sets, there being an upright at each side of the ingress and an upright at each side of the egress, hammock bars substantially horizontally arranged at opposite sides of said frame, said hammock bars each having a vertical slide connection with the corresponding set of uprights at the ingress end and the egress end of said frame, a lift device for imparting elevational movement to one of said hammock bars, pulleys supported on said frame, and flexible elements engaged with said pulleys and connecting corresponding ends of said hammock bars so that when the last mentioned hammock bar is raised a similar movement will be imparted to the other hammock bar, and a hammock attached to said hammock bars.

6. A structure as set forth in claim 5, in which the uprights consist of tubular members provided with longitudinal slots, and in which the hammock bars have end parts slidably extending into said slots respectively, and provided with slides freely lodged in said tubular members.

7. A structure as set forth in claim 5, in which the lifting device is connected to the one said hammock bar at a point along the length thereof, and in which a flexible element is trained over pulleys on the frame and connected to the ends of said hammock bar to cause it to move with a parallel motion.

References Cited in the file of this patent

UNITED STATES PATENTS

| | | |
|---|---|---|
| 36,920 | Sinclair | Nov. 11, 1862 |
| 161,825 | Relph | Apr. 6, 1875 |
| 192,672 | Bowman et al. | July 3, 1877 |
| 321,999 | Parker | July 14, 1885 |
| 502,054 | Sirois | July 25, 1893 |
| 1,015,239 | Miller | Jan. 16, 1912 |
| 2,278,298 | Young | Mar. 31, 1942 |
| 2,482,155 | Crandall | Sept. 20, 1949 |
| 2,672,126 | Linton | Mar. 16, 1954 |